United States Patent
Makowski et al.

(10) Patent No.: US 11,176,304 B2
(45) Date of Patent: Nov. 16, 2021

(54) ROUTING A CELL OF A SEMICONDUCTOR CHIP

(71) Applicant: International Business Machines Corporation, Armonk, NY (US)

(72) Inventors: Thomas Makowski, Pfullingen (DE); Matthias Ringe, Tuebingen (DE); Andreas H. A. Arp, Nufringen (DE); Michael V. Koch, Ehningen (DE); Fatih Cilek, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 16/595,957

(22) Filed: Oct. 8, 2019

(65) Prior Publication Data
US 2021/0103641 A1    Apr. 8, 2021

(51) Int. Cl.
*G06F 30/30* (2020.01)
*G06F 30/394* (2020.01)
*G06F 119/18* (2020.01)

(52) U.S. Cl.
CPC ........ *G06F 30/394* (2020.01); *G06F 2119/18* (2020.01)

(58) Field of Classification Search
CPC .... G06F 7/4876; G06F 7/501; G06F 9/30014; G06F 17/16; G06F 2207/4824; G06F 7/5443; G06F 7/485; H03M 7/24; G06N 3/063; G06N 3/084; G06N 3/0481; G06N 20/00; G06N 3/02
USPC ......................................................... 716/55
See application file for complete search history.

(56) References Cited

U.S. PATENT DOCUMENTS

| | | | |
|---|---|---|---|
| 8,732,640 B1 | 5/2014 | Krishnan et al. | |
| 2011/0272776 A1* | 11/2011 | Omura | H01L 27/0207 257/503 |
| 2014/0304671 A1 | 10/2014 | Lu et al. | |
| 2016/0103940 A1 | 4/2016 | Kerre et al. | |
| 2019/0026417 A1 | 1/2019 | de Dood et al. | |

OTHER PUBLICATIONS

Cremer et al. "Automatic Cell Layout in the 7nm Era", 2017 ACM on International Symposium on Physical Design, Mar. 2017 (Year: 2017).*
http://meanmean.me/2016/12/13/swp.html, "The Statistician's Apprentice: An Introduction to the SWP Operator", Dec. 13, 2016 (Year: 2016).*

* cited by examiner

*Primary Examiner* — Jack Chiang
*Assistant Examiner* — Brandon Bowers
(74) *Attorney, Agent, or Firm* — Donald J. O'Brien (57) ABSTRACT

Embodiments are disclosed for routing a cell of a semiconductor chip, the cell being represented by a matrix, encoding first tracks of the cell as columns of the matrix and second tracks of the cell as rows of the matrix, respectively. The method includes performing a sweep operation on the matrix, the sweep operation including generating an index structure indexed by columns of the matrix, the index structure including information on candidate cut shapes that can be placed in a particular column of the matrix. Additionally, the method includes recursively placing cut shapes into the cell based on the index structure, one recursion of the placing including finding a possible cut shape and recursively placing the remaining cut shapes.

20 Claims, 7 Drawing Sheets

ROUTING A CELL OF A SEMICONDUCTOR CHIP

BACKGROUND

The present disclosure relates in general to data processing systems, in particular, to a method for routing a cell of a semiconductor chip, as well as a computer program product and a data processing system.

When producing integrated circuits, a number of process layers are formed on a substrate, each process layer incorporating a layout pattern. The layout patterns within the various layers can establish component features and interconnections such that once the final process layer has been formed, an integrated circuit has been produced containing the circuit components interconnected in a manner for performing the functions of the integrated circuit.

SUMMARY

According to some embodiments of the present disclosure, a method is proposed for routing a cell of a semiconductor chip, the cell being represented by a matrix, encoding first tracks of the cell as columns of the matrix and second tracks of the cell as rows of the matrix, respectively. The method includes performing a sweep operation on the matrix, the sweep operation including generating an index structure indexed by columns of the matrix, the index structure including information on candidate cut shapes that can be placed in a particular column of the matrix. Additionally, the method includes recursively placing cut shapes into the cell based on the index structure, one recursion of the placing including finding a possible cut shape and recursively placing the remaining cut shapes.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

For a new integrated circuit, a layout of that integrated circuit will be produced in the form of a data file identifying the required layout patterns for each of the process layers. To assist in the generation of such a layout, it is known to use cell libraries providing a plurality of different cells, each cell defining a layout for a particular component. Various types of cells are used in modern systems for generating integrated circuit layouts, for example standard cells, data path cells, custom cells, cells representing portions of a memory device, etc.

In the drawings, like elements are referred to with equal reference numerals. The drawings are merely schematic representations, not intended to portray specific parameters of the present disclosure. Moreover, the drawings are intended to depict only typical embodiments of the present disclosure and therefore should not be considered as limiting the scope of the present disclosure.

The illustrative embodiments described herein provide a method for routing a cell of a semiconductor chip, the cell being represented by a matrix, encoding first tracks of the cell as columns of the matrix and second tracks of the cell as rows of the matrix, respectively. The illustrative embodiments can be used for the method including (i) performing a sweep operation on the matrix, the sweep operation including generating an index structure indexed by columns of the matrix, the index structure including information on candidate cut shapes that can be placed in a particular column of the matrix; and (ii) recursively placing cut shapes into the cell based on the index structure, one recursion of the placing including finding a possible cut shape and recursively placing the remaining cut shapes.

The illustrative embodiments are sometimes described herein using particular technologies only as an example for the clarity of the description.

Metal layers for the connections on a semiconductor chip for "sea of metal" technology are made by the foundry already. Inserting "cut shapes" creates isolated shapes which realize the "routing" of the cell. According to constraints of a foundry, cut shapes can follow distance rules to each other and to vias in the layout structure.

Therefore, routing the cell can further be based on a sea-of-metal technology, where uniform metal layers fill the whole area of the semiconductor wafer. Multiple mask layers can be used for patterning the necessary structures for designing semiconductor devices on a wafer. The different mask layers can be independent from each other and can be characterized by sets of mask data.

User setup cell parameters can include setting device orders, setting track numbers for vertical routes of the mask data as first tracks and setting top layer horizontal track numbers, related to the device placement, for horizontal routes of the mask data as second tracks. Crossings of given device positions and track assignments can create via positions for establishing contacts between different mask layers. Vias may not be limited to two metal layers but can also extend to multiple metal layers.

Routing the cell can include generating multiple sets of mask data according to a self-aligned multi patterning (SAxP) manufacturing technology. Cut shapes generated during the routing can be placed independently on the different sets of mask data.

From a given device and track assignment, there can be different possible cut shape positions. In some embodiments, the cut shape positions can be determined with the following constraints.

The capacity can be kept as small as possible.

A fast algorithm can be used for routing the cell. The algorithm can be called e.g. a billion times on a chip for each cell as it is a just in time code and therefore is called whenever the cell is drawn.

The routing can create deterministic results, which means that a given set of parameters can give the same results to not break building the chip.

Figure 1:
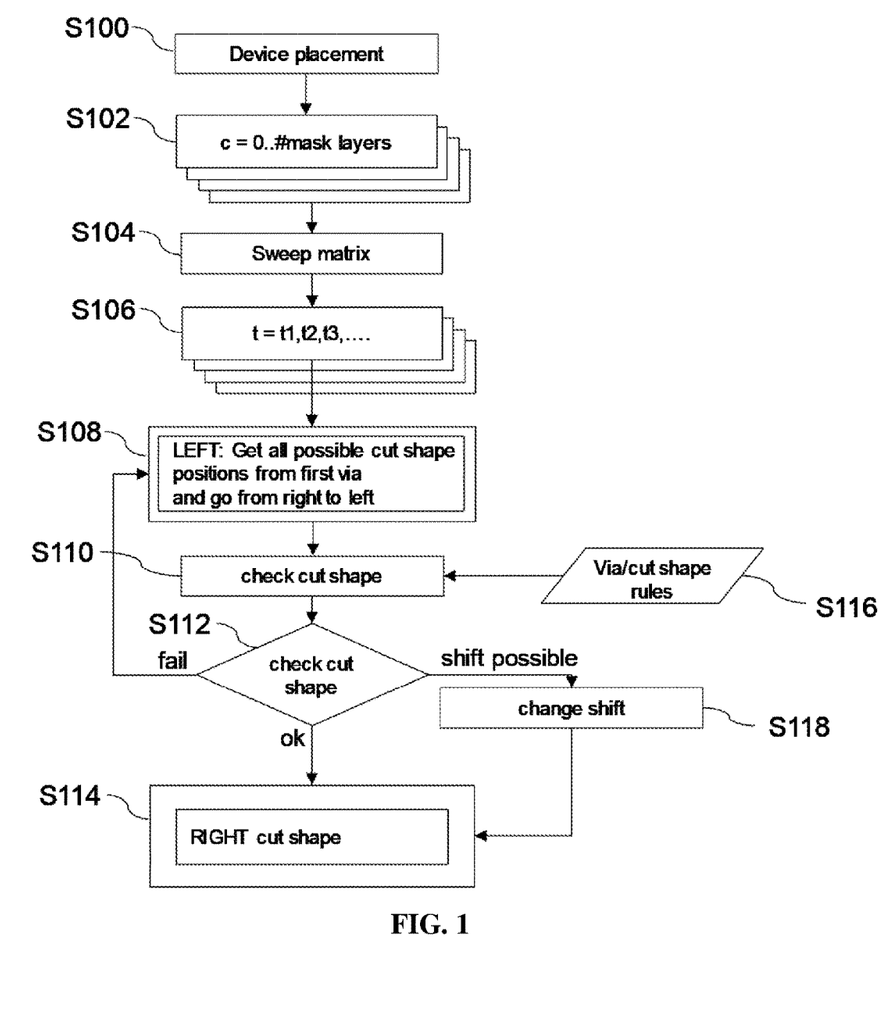
FIG. 1 depicts an overall flow chart of the method for routing a cell of a semiconductor chip according to some embodiments of the present disclosure.

FIG. 1 depicts an overall flow chart of the method for routing a cell 10 of a semiconductor chip according to some embodiments of the present disclosure.

Figure 2:
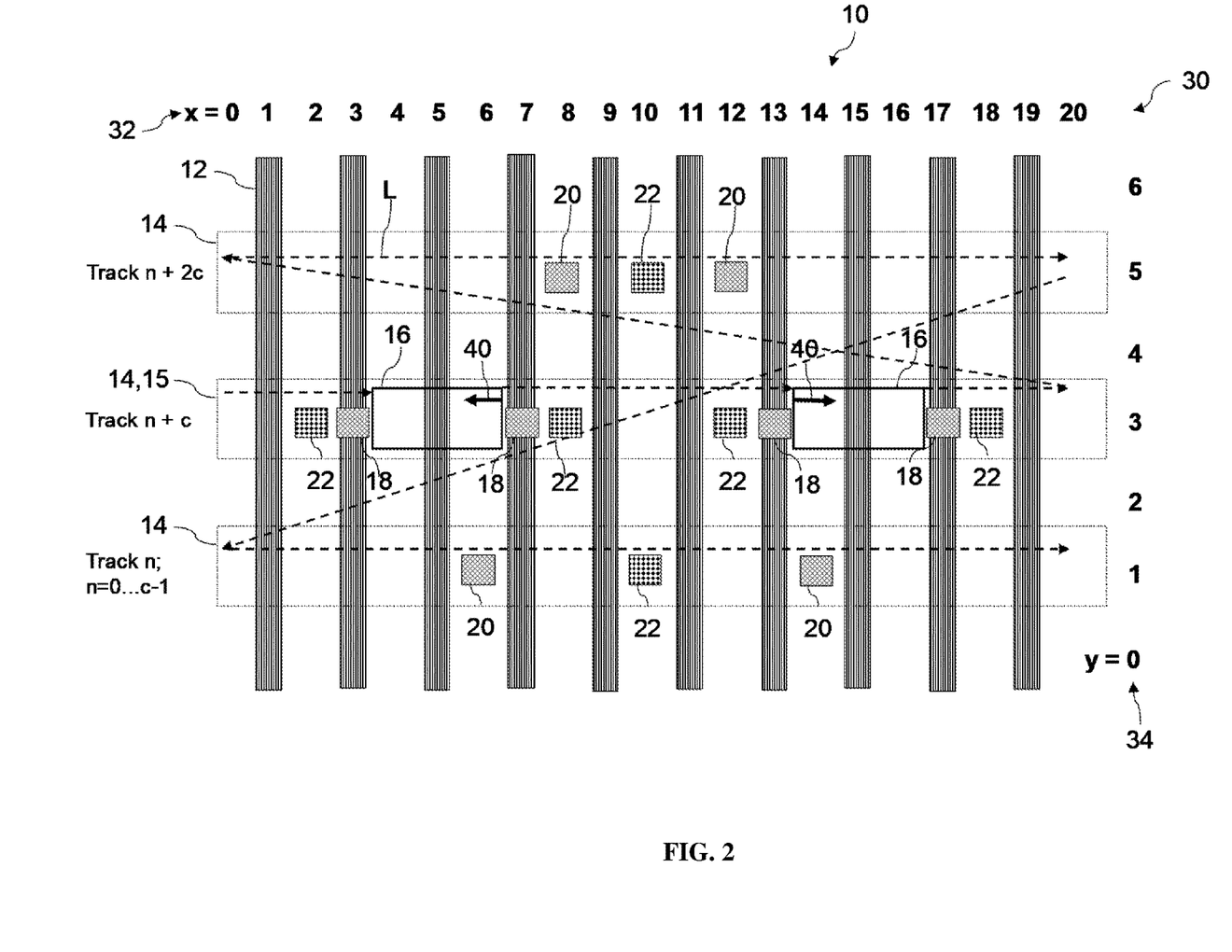
FIG. 2 depicts a schematic configuration of the cell with a routing flow according to some embodiments of the present disclosure.

References refer to elements of the schematic configuration of the cell 10 depicted in FIG. 2.

The cell 10 is represented by a matrix 30, encoding first tracks 12 of the cell 10 as columns 32 of the matrix 30 and second tracks 14 of the cell 10 as rows 34 of the matrix 30, respectively.

The method includes (i) performing a sweep operation on the matrix 30, the sweep operation including generating an index structure indexed by columns 32 of the matrix 30, the index structure including information on candidate cut shapes 16 that can be placed in a particular column 32 of the matrix 30. Further the method includes recursively placing cut shapes 16 into the cell 10 based on the index structure, one recursion of the placing including finding a possible cut shape 16 and recursively placing the remaining cut shapes 16.

The index structure includes information on at least one of pre-defined vias 20, pre-defined gate vias 18, possible small shifts 40 of cut shapes 16, or identifiers of electrical nets. Positions of vias 18, 20 are defined by crossings of given device positions and assignments of tracks 14.

According to some embodiments of the present disclosure, the cell 10 can be a parameterized cell representing a physical circuit. The cell 10 can particularly be one of an INV, NAND/NOR234, AOI/OAI21/22, or XOR/XNOR2 gate.

In FIG. 1, the program flow can start in operation S100 with placing electronic devices and setting vias 18, 20 in the matrix 30. A device routine draws front end of lines and sets vias 18, 20 in the matrix 30 characterized by first tracks 12 and second tracks 14 being represented by columns 32 and rows 34 in the matrix 30.

In operation S102, a loop is started through all independent sets of mask data. This can be done in parallel as the sets of mask data represent independent mask layers.

In operation S104, the sweep operation is performed on the matrix 30. Directions of possible shifts 40 are set and an index structure is built to get through all rows 34 of the matrix 30, counting positions of possible cut shapes 16.

In operation S106, a second loop starts, going through the second tracks 14 of one set of mask data by starting with a highest-weighted track 15 in order to get a fast solution.

Looping through second tracks 14 of one set of mask data by starting with a highest-weighted track 15 is performed by starting with a track 14 with the most gate vias 18 and going from a low column index side of the track 14 to a high column index side and checking the positions of the vias 18 for a valid solution, until all possible positions are checked.

In operation S108, a first possible position of a cut shape 16 on a low column index side of the highest-weighted track 15 of the matrix 30 is searched. For this purpose it can be started from a first via 18, 20 on the low column index side to a high column index side of the highest-weighted track 15.

Once a cut shape 16 is found, the position of the cut shape 16 can be checked in operation S110 according to predefined design rules translated from an appropriate design rules deck. Via and cut shape rules can be input to the algorithm in operation S116.

A position of a cut shape 16 can be found by minimizing a capacity of the tracks 12, 14 as a constraint. If the design rules are fulfilled in operation S112, then recursively, a next cut shape 16 can be found in the same highest-weighted track 15. If the design rules fail in operation S112, a next possible cut shape 16 on the low column index side of the highest-weighted track 15 can be found by going back to operation S108.

If the cut shape 16 is not valid in operation S112 but could be made valid with another value for a shift 40, the value of the shift 40 can be changed in operation S118, proceeding then to the operation S114. Operation S114 is explained in detail in FIG. 5.

Figure 3:
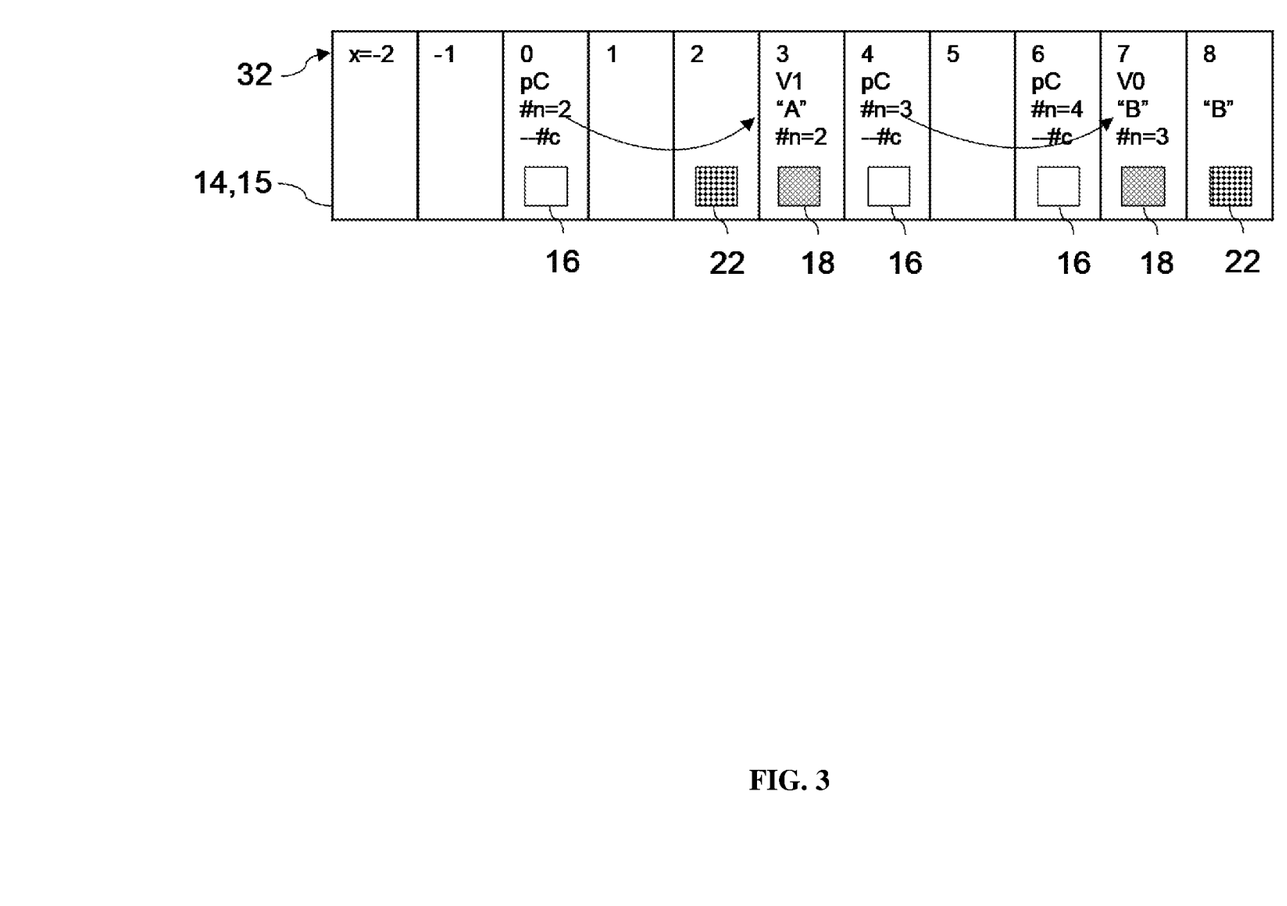
FIG. 3 depicts a schematic routing flow for one track according to some embodiments of the present disclosure.
Figure 4:
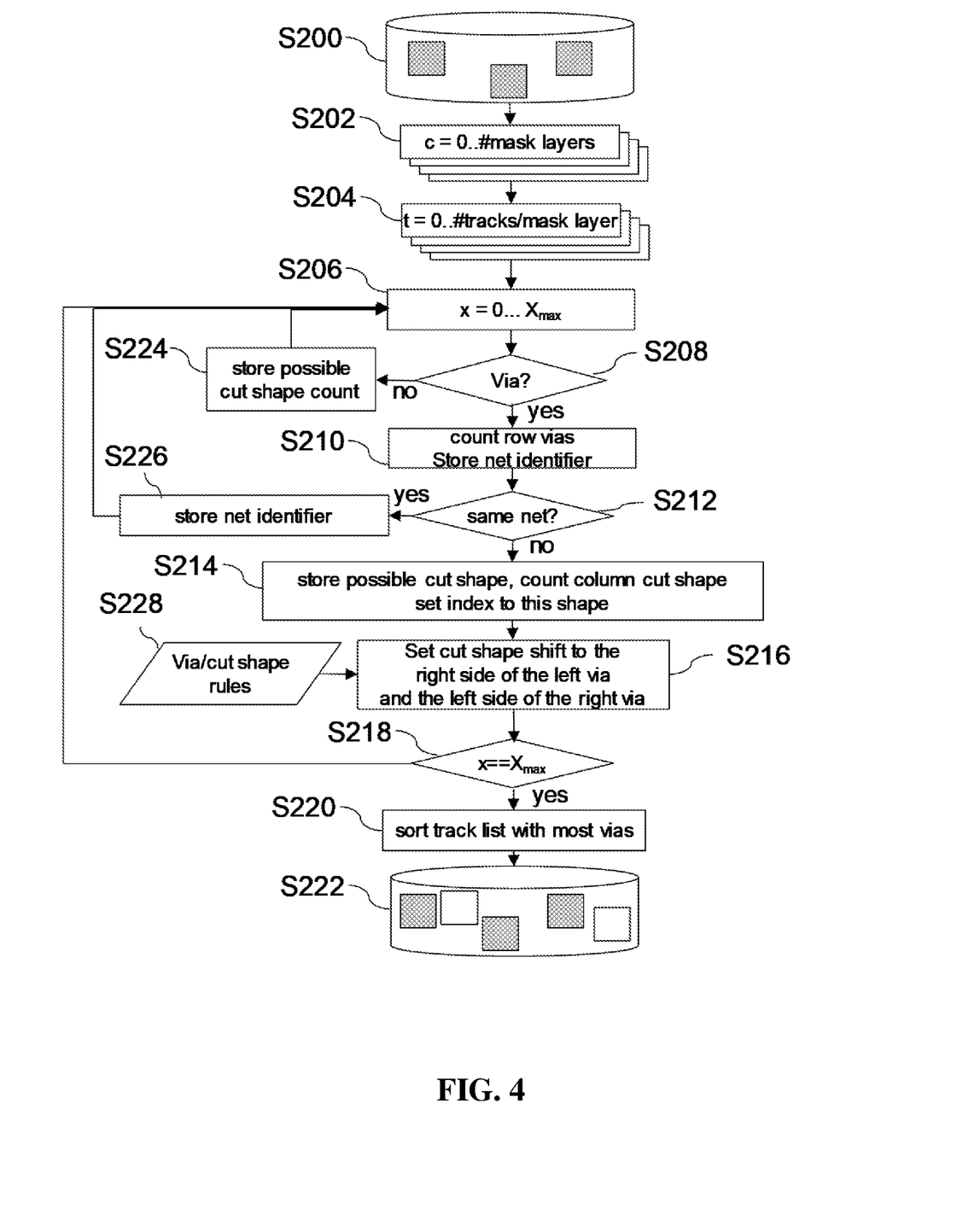
FIG. 4 depicts a detailed flow chart of a sweep matrix flow according to some embodiments of the present disclosure.

FIG. 2 depicts a schematic configuration of a cell 10 with a routing flow according to some embodiments of the present disclosure, whereas FIG. 3 depicts a schematic routing flow for one track 14, 15. In FIG. 4, a detailed flow chart of a sweep matrix flow according to some embodiments of the present disclosure is depicted.

In FIG. 2, the columns 32 and rows 34 of the matrix 30 are indexed. An even index of a column 32 can represent a drain connection, whereas an uneven index can represent a gate connection of the cell 10. An index of y=0 of a row 34 can represent a power track, as well as an index of y=6.

In the schematic configuration of the cell 10 in FIG. 2, normal drain vias 20, as well as gate vias 18, are marked. Additionally, net shapes 22 of electrical nets are shown.

In a row index of y=1 of the matrix 30, a track 14 with an index n is marked, where n is a number between 0 and a number of c−1, with c being the number of different sets of mask data. A further track 14, 15 with an index n+c is marked, and another track 14 with an index of n+2c.

Possible cut shapes 16 are shown in FIG. 2, as well as possible shifts 40 of the cut shapes 16.

In the routing flow of FIG. 3, possible cut shapes 16 (pC) are shown in columns 32 with an index of x=0, 4 and 6. Vias 18 are shown in columns 32 with an index of x=3 and 7 (V1, V0), whereas net shapes 22 of electrical nets are positioned in columns 32 with an index of x=2 and 8.

In FIG. 4, the program flow performing the sweep operation on the matrix 30 with vias 18, 20 set is described in detail. Performing the sweep operation on the matrix 30 is performed by starting with the track 14 with the highest number of gate vias 18.

In operation S200, the matrix 30 with vias 18, 20 set is taken as an input for the program flow.

In operation S202, a loop is started through all independent sets of mask data, followed by the loop through all tracks 14 of one set of mask data in operation S204.

In operation S206, the method can go through a row 34 of the matrix 30 from a low column index side (x=0) to a high column index side (x=Xmax), meaning going from left to right in the two-dimensional representation of the matrix 30 shown in FIG. 2.

In operation S208, the method can check if a via 18, 20 exists. If there is no via 18, 20, the method can proceed to the next column index 32 by returning to operation S206 via storing possible cut shape counts in operation S224.

If a via 18, 20 is found in operation S208, then in operation S210 the via 18, 20 is counted for the row 34. If the via 18, 20 belongs to the same net identifier as the one checked in operation S212, no cut shape 16 is required. Accordingly, the net identifier can be stored in operation S226, returning to operation S206 for the next column index.

If the via 18, 20 is a new via 18, 20, the net identifier and cut shape parameters are stored in operation S214 as shown in FIG. 3. Each position gets a net identifier or a possible cut shape label. An index marks a chain from a low index to a higher index from a cut shape 16 to a via 18, 20 to the next cut shape 16 for fast routing. Cut shapes 16 of the specific column 32 are counted. The current index is set to the cut shape 16.

In operation S216, it is stored how many cut shapes 16 could be shifted to left/right by setting a shift 40 of the cut shape 16 to the high column index side of the lower indexed via 18, 20 and the low column index side of the higher indexed via 18, 20. The cut shapes 16 of the specific column 32 are counted. The shift 40 of the belonging via 18, 20 is set.

Input to the process operation S216 is given by the via and cut shape rules. These predefined design rules can include cut shapes 16 that follow distance rules to each other and to vias 18, 20.

In operation S218, the method can check if the column index has already reached the highest index x=Xmax. If so, the list of tracks 14 is sorted in operation S220 by starting with the track 14 with most gate vias 18. Otherwise, the program flow returns to operation S206. Thus, recursively placing the cut shapes 16 includes determining among the second tracks 14 the one having a maximum number of gate vias 18.

Accordingly, operation S222 can deliver a matrix with cut shapes 16 set.

Figure 5:
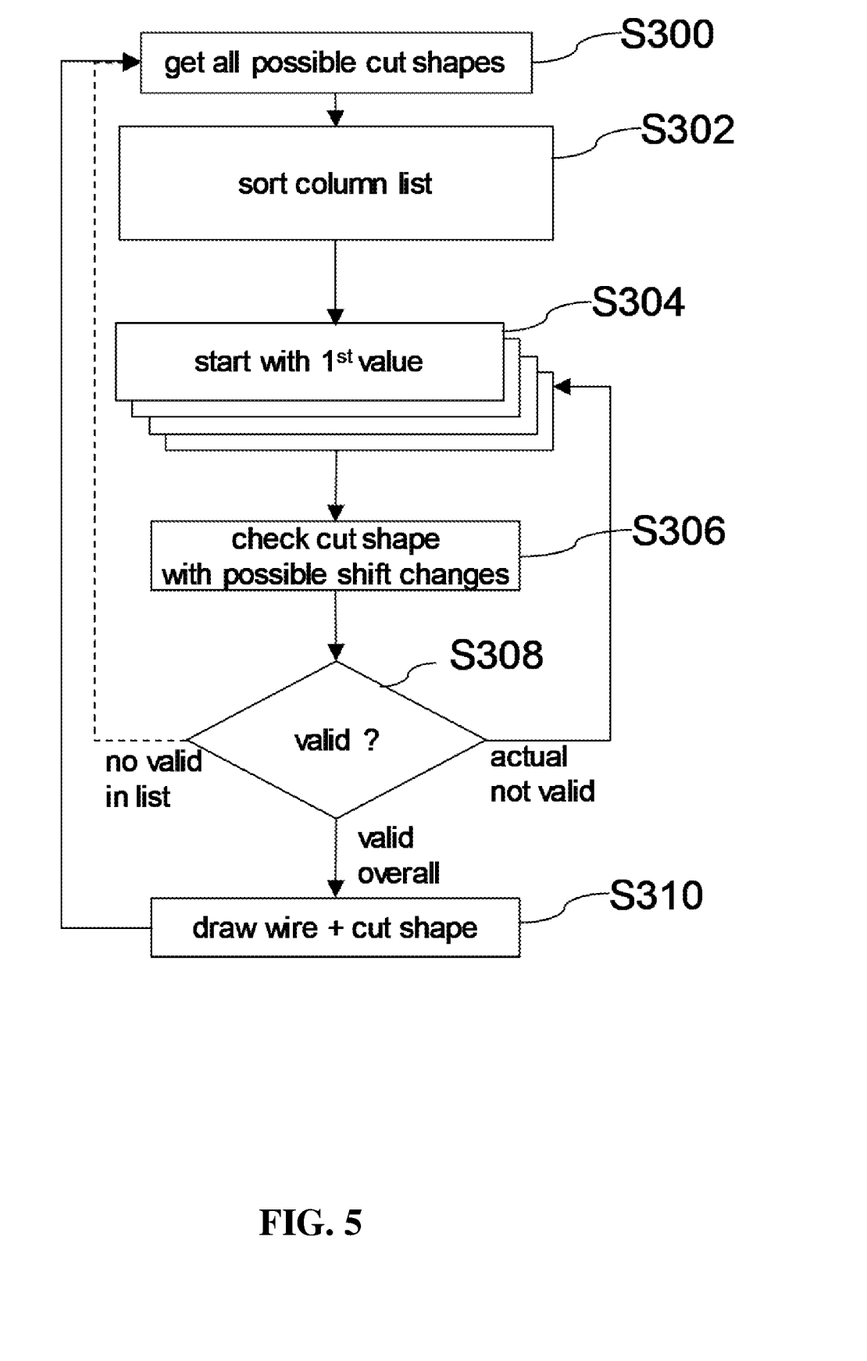
FIG. 5 depicts a detailed flow chart for selecting cut shapes according to some embodiments of the present disclosure.

FIG. 5 depicts a detailed flow chart for selecting cut shapes 16 according to some embodiments of the present disclosure.

In operation S300, possible cut shapes 16 are retrieved from the indexed matrix 30.

In operation S302, a column list with the highest numbers of possible cut shapes 16 is sorted, starting with the lowest indexed column 32.

The column list with x positions of the columns with the highest column numbers is created. A possible cut shape 16 increases the column value by 1, an already set cut shape by another 1. If there are more columns 32 with the same column number, the lowest indexed column number is taken, which means that a fast solution with most cut shapes 16 in one column with less capacitance can be found. Additionally, a list pointer is set to the top column 32.

Thus, one recursion includes: selecting among the columns 32 the one with a maximum number of candidate cut shapes 16 and already placed cut shapes 16, and placing a new cut shape 16 into the selected column 32.

In operation S304, the flow is started with the first cut shape 16 by retrieving the column number 32 out of the column list.

In operation S306, the cut shape 16 is checked for possible changes of the shift 40, if the position of the cut shape 16 is valid (or could be valid with a changed shift 40.) If a cut shape 16 is not valid but could be made valid with another value of the shift 40, the present shift 40 is changed to this value of the shift 40.

If the position of the cut shape 16 is valid, the procedure is called recursively to set the next cut shape 16. This could be a cut shape 16 on the left, low-index, side of the right, high-index, side cut shape 16, if there is enough space. This means doing a left cut shape 16 with the same procedure in an opposite direction.

Otherwise, a pointer is set to the next column 32 in the list, returning to operation S304. If it is the last column 32, this solution is not valid. This recursion is closed and the flow returns to the beginning of the loop in operation S300 (dashed line).

If the cut shape 16 is the last cut shape 16 and has a valid position, the current cut shape 16 is drawn in a routing layout of the cell 10, going back through all recursive solutions and drawing all valid cut shapes 16, operation S310.

Figure 6:
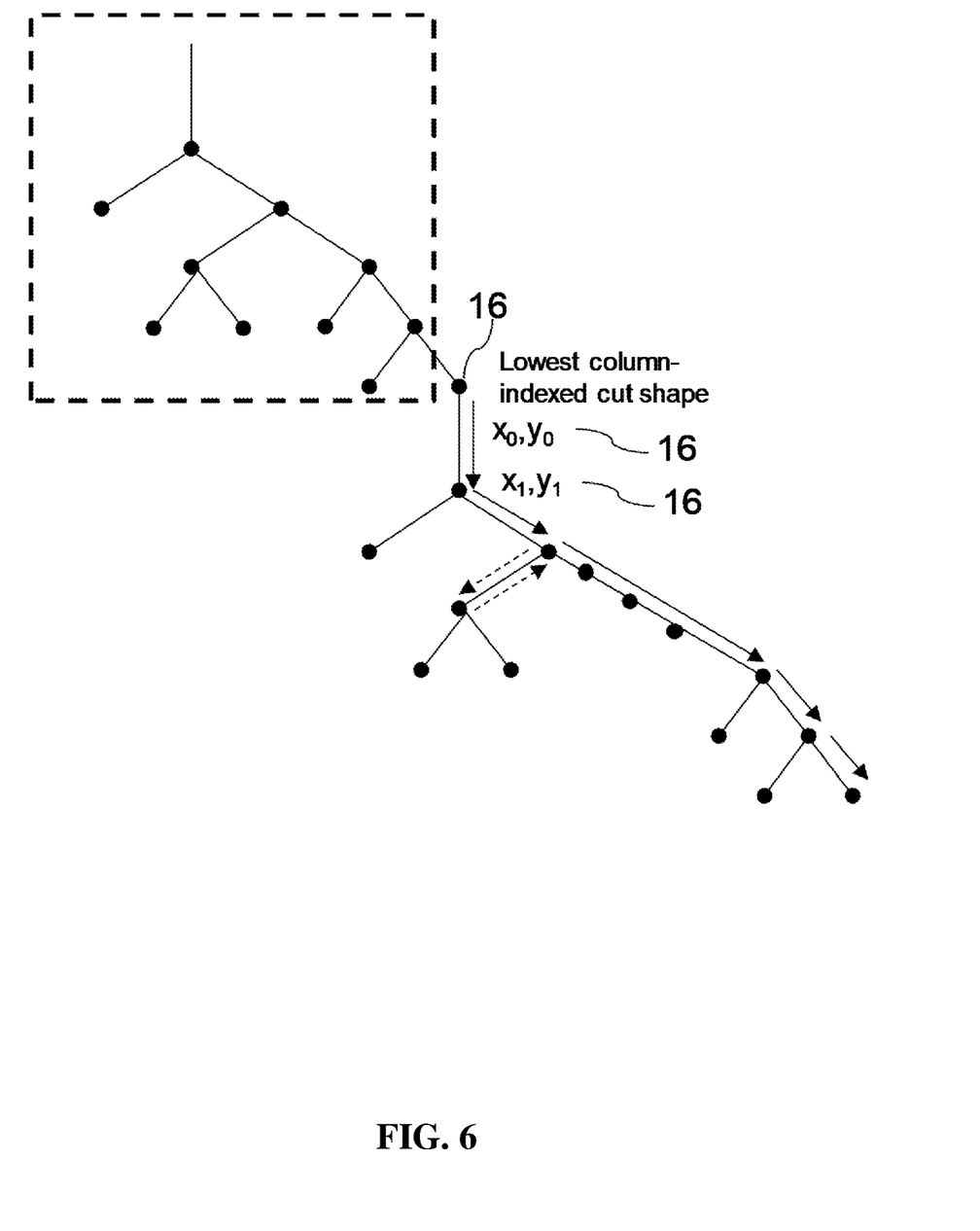
FIG. 6 depicts a schematic binary tree visualizing finding cut shapes according to some embodiments of the present disclosure.

FIG. 6 depicts a schematic binary tree visualizing finding cut shapes 16 according to some embodiments of the present disclosure.

According to some embodiments of the present disclosure, finding and setting the cut shapes 16 means to find a fast solution recursively. The described method can be compared to searching a binary tree with a deterministic solution. According to the described method, it is not necessary to search the whole tree for getting a favorable solution. It also means not to make too many wrong decisions.

Starting with a second track 14 of the matrix 30 with the most vias 18, 20 will cut the binary tree at the beginning. Using an index to the next block of possible solutions removes parts of the tree in the middle. This is symbolized by the broken line rectangle.

In FIG. 6, e.g., a first cut shape 16 with indices x0, y0 is found, leading to a next cut shape 16 with indices x1, y1. Finding useful positions of possible cut shapes 16 means following the solid line arrows, marked in FIG. 6. According to embodiments of the present disclosure, it is not necessary to follow the broken line arrows in order to find useful solutions for positions of cut shapes 16.

Figure 7:
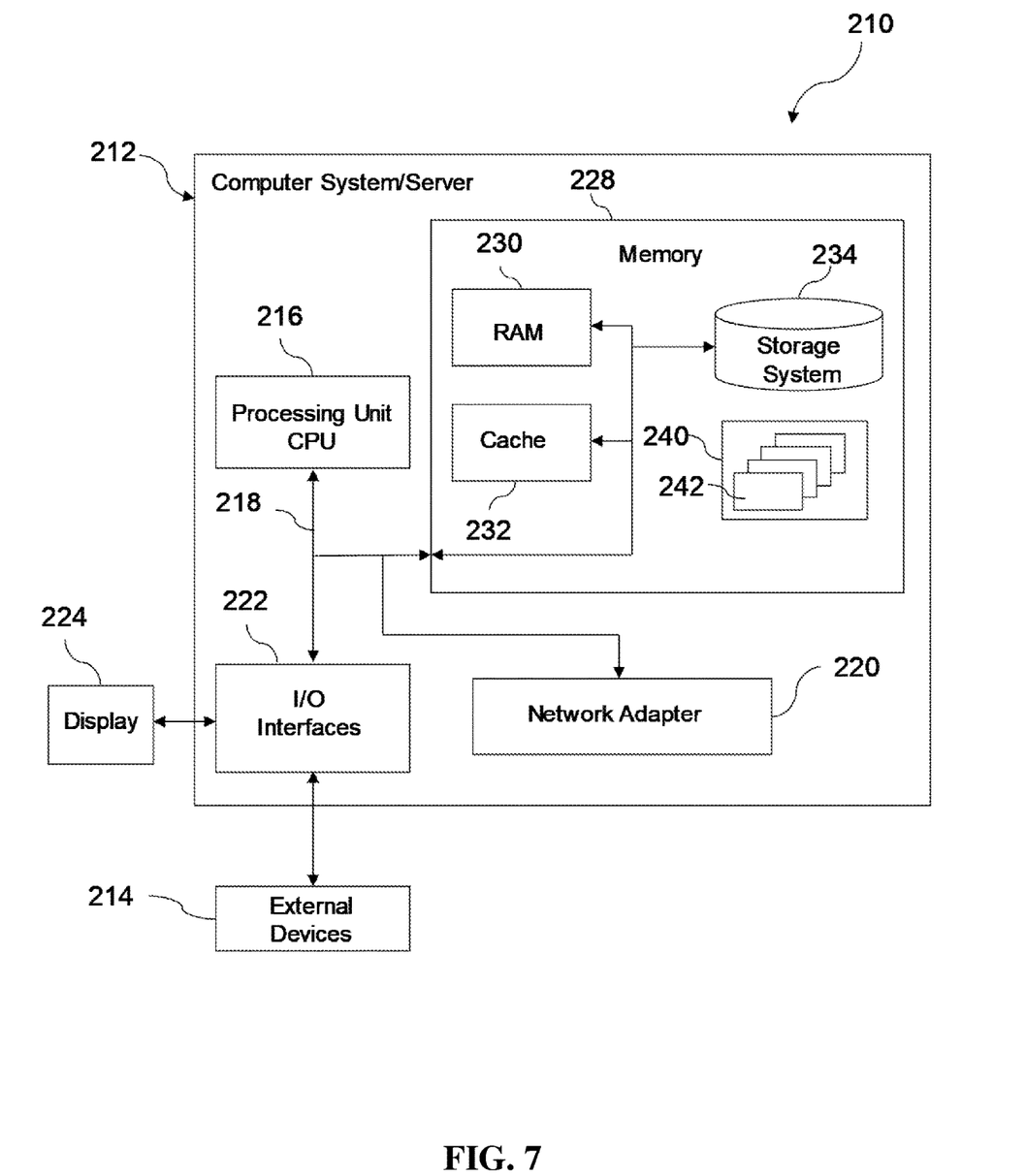
FIG. 7 depicts an example embodiment of a data processing system for executing a method according to the present disclosure.

Referring now to FIG. 7, a schematic of an example of a data processing system 210 is shown. Data processing system 210 is only one example of a suitable data processing system and is not intended to suggest any limitation as to the scope of use or functionality of embodiments of the present disclosure described herein. Regardless, data processing system 210 is capable of being implemented and/or performing any of the functionality set forth herein above.

In data processing system 210, there is a computer system/server 212, which is operational with numerous other general-purpose or special-purpose computing system environments or configurations. Examples of well-known computing systems, environments, and/or configurations that can be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 can be described in the general context of computer system executable instructions, such as program modules, being executed by a computer system. Generally, program modules can include routines, programs, objects, components, logic, data structures, and so on that perform particular tasks or implement particular abstract data types. Computer system/server 212 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 7, computer system/server 212 in data processing system 210 is shown in the form of a general-purpose computing device. The components of computer system/server 212 can include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media can be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 can further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 can include at least one program product having a set (e.g., at least one) of program modules that are configured to carry out the functions of embodiments of the present disclosure.

Program/utility 240, having a set (at least one) of program modules 242, can be stored in memory 228 by way of example, and not limitation, as well as an operating system, one or more application programs, other program modules, and program data. Each of the operating system, one or more application programs, other program modules, and program data or some combination thereof, can include an implementation of a networking environment. Program modules 242 generally carry out the functions and/or methodologies of embodiments of the present disclosure as described herein.

Computer system/server 212 can also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present disclosure can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for routing a cell of a semiconductor chip, the cell being represented by a matrix, encoding first tracks of the cell as columns of the matrix, and second tracks of the cell as rows of the matrix, respectively, the method including:
   placing electronic devices, including vias, in the matrix;
   setting the vias in the matrix, wherein positions of the vias are defined by crossings of positions of the electronic devices and assignments of tracks;
   looping through independent sets of mask data;
   performing a sweep operation on the matrix, the sweep operation including generating an index structure indexed by columns of the matrix, the index structure including information on candidate cut shapes that can be placed in a particular column of the matrix; and
   recursively placing cut shapes into the cell based on the index structure, one recursion of placing including finding a possible cut shape and recursively placing one or more remaining cut shapes.

2. The method according to claim 1, wherein the one recursion includes selecting among the columns the one with a maximum number of candidate cut shapes and already placed cut shapes and placing a new cut shape into the selected column.

3. The method according to claim 1, wherein the index structure includes information on at least one of pre-defined vias, pre-defined gate vias, possible small shifts of cut shapes, or identifiers of electrical nets.

4. The method according to claim 1, wherein recursively placing the cut shapes includes determining among the second tracks of the cell, one of the second tracks of the cell having a maximum number of gate vias.

5. The method according to claim 1, wherein routing the cell includes generating multiple sets of mask data according to a self-aligned multi patterning manufacturing technology and wherein the cut shapes are placed independently on different sets of mask data.

6. The method according to claim 1, further including:
   setting directions of possible shifts and building the index structure;
   counting positions of possible cut shapes;
   looping through second tracks of one set of mask data by starting with a highest-weighted track of the matrix;
   finding a first possible position of a cut shape on a low column index side of the highest-weighted track of the matrix by starting from a first via on the low column index side to a high column index side of the highest-weighted track;

checking the position of the cut shape according to predefined design rules; and if the design rules are fulfilled, then recursively get a next cut shape in a same highest-weighted track, otherwise get a next possible cut shape on the low column index side of the highest-weighted track.

7. The method according to claim 6, wherein looping through the second tracks of one set of mask data by starting with the highest-weighted track of the matrix is performed by starting with a track with a most gate vias and going from a low column index side of the track to the high column index side and checking the positions of the vias for a valid solution, until all possible positions are checked.

8. The method according to claim 6, wherein the predefined design rules include cut shapes having to follow distance rules to each other and to vias.

9. The method according to claim 6, further, for performing the sweep operation on the matrix with vias set, further including:
looping through the independent sets of mask data;
looping through tracks of one set of mask data;
looping through a row of the matrix from the low column index side to the high column index side;
checking for a via;
if the row of the matrix does not include the via, proceeding to the next column index;
finding the via and counting the via for the row;
if the via belongs to a same net identifier as one above, no cut shape is required;
storing the same net identifier;
if the via is a new via, storing the net identifier and cut shape parameters; counting cut shapes of a specific column;
setting a current index to the cut shape;
setting a shift of the cut shape to the high column index side of a lower indexed via and the low column index side of a higher indexed via;
counting the cut shapes of the specific column;
setting a shift of a belonging via; and
sorting a list of tracks starting with a track having a most gate vias.

10. The method according to claim 6, further including getting the next cut shape in the same highest-weighted track by:
getting possible cut shapes out of an indexed matrix;
sorting a column list with a highest number of possible cut shapes, starting with a lowest indexed column;
starting with the first cut shape by retrieving a column number out of the column list;
checking the cut shape for possible changes of the shift, if the position of the cut shape is valid;
if the position of the cut shape is valid, recursively calling the next cut shape, otherwise setting a pointer to the next column in the list; and
if the cut shape is a last cut shape and has a valid position, drawing a current cut shape in a routing layout of the cell, going back through a plurality of recursive solutions and drawing a plurality of valid cut shapes.

11. The method according to claim 10, further, for sorting the column list with the highest numbers of possible cut shapes, creating the column list with a number of positions with highest column numbers and if there are more columns with the same number taking a column with a lowest index and setting a list pointer to a top column.

12. The method according to claim 1, further including performing the sweep operation on the matrix by starting with a track with a highest number of gate vias.

13. The method according to claim 1, wherein positions of vias are defined by crossings of given device positions and assignments of tracks.

14. The method according to claim 1, wherein routing the cell is based on a sea-of-metal technology.

15. The method according to claim 1, wherein the cell is a parameterized cell representing a physical circuit.

16. The method according to claim 1, wherein the cell is selected from a group consisting of an INV, NAND/NOR234, AOI/OAI21/22, or XOR/XNOR2 gate.

17. The method according to claim 1, further including finding a position of a cut shape by minimizing a capacity of the tracks as a constraint.

18. The method according to claim 1, wherein, if a cut shape is not valid but could be made valid with an alternate value of a shift, a present shift is changed to the alternate value of the shift.

19. A computer program product for routing a cell of a semiconductor chip, the cell being represented by a matrix, encoding first tracks of the cell as columns of the matrix, and second tracks of the cell as rows of the matrix, respectively, the computer program product including a computer readable storage medium having program instructions embodied therewith, the program instructions executable by a computer system to cause the computer system to perform a method including:
placing electronic devices, including vias, in the matrix;
setting the vias in the matrix, wherein positions of the vias are defined by crossings of positions of the electronic devices and assignments of tracks;
looping through independent sets of mask data;
performing a sweep operation on the matrix, the sweep operation including generating an index structure indexed by columns of the matrix, the index structure including information on candidate cut shapes that can be placed in a particular column of the matrix; and
recursively placing cut shapes into the cell based on the index structure, one recursion of placing including finding a possible cut shape and recursively placing one or more remaining cut shapes.

20. A system including:
a computer processing circuit; and
a computer-readable storage medium storing instructions, which, when executed by the computer processing circuit, are configured to cause the computer processing circuit to perform a method including:
placing electronic devices, including vias, in a matrix;
setting the vias in the matrix, wherein positions of the vias are defined by crossings of positions of the electronic devices and assignments of tracks;
looping through independent sets of mask data;
performing a sweep operation on the matrix, the sweep operation including generating an index structure indexed by columns of the matrix, the index structure including information on candidate cut shapes that can be placed in a particular column of the matrix; and
recursively placing cut shapes into a cell based on the index structure, one recursion of placing including finding a possible cut shape and recursively placing one or more remaining cut shapes.

* * * * *